(12) United States Patent
Jiang et al.

(10) Patent No.: US 7,858,736 B2
(45) Date of Patent: Dec. 28, 2010

(54) POLYMER RECOVERY METHOD

(75) Inventors: Peijun Jiang, League City, TX (US); Robert Olds Hagerty, La Porte, TX (US); John Richard Shutt, Merchtem (BE); Charles Stanley Speed, Dayton, TX (US); Randall B. Laird, Pasadena, TX (US); Kevin B. Stavens, Seabrook, TX (US); Larry L. Iaccino, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 543 days.

(21) Appl. No.: 11/628,167

(22) PCT Filed: Jun. 20, 2005

(86) PCT No.: PCT/US2005/021654

§ 371 (c)(1),
(2), (4) Date: Nov. 30, 2006

(87) PCT Pub. No.: WO2006/009951

PCT Pub. Date: Jan. 26, 2006

(65) Prior Publication Data

US 2009/0118466 A1    May 7, 2009

Related U.S. Application Data

(60) Provisional application No. 60/581,524, filed on Jun. 21, 2004.

(51) Int. Cl.
*C08F 6/00* (2006.01)
(52) U.S. Cl. .................. 528/484; 528/480; 528/496; 528/497; 528/501; 528/502 R; 526/67; 526/70; 526/71; 526/72; 526/74; 526/242; 526/253; 526/254; 526/348
(58) Field of Classification Search .......... 528/484, 528/491, 501, 729, 480, 482, 490, 496, 497, 528/502 R; 526/74, 106, 124, 348, 206, 526/70, 71, 72, 75, 89, 242, 252, 253, 254; 585/359; 568/615, 677, 683, 775, 842
See application file for complete search history.

(56) References Cited

U.S. PATENT DOCUMENTS

| | | | |
|---|---|---|---|
| 2,474,571 A | 6/1949 | Brakeley et al. |
| 2,494,585 A | 1/1950 | Saylor et al. |
| 2,534,698 A | 12/1950 | Calfee et al. |
| 2,548,415 A | 4/1951 | Welch et al. |
| 2,603,626 A | 7/1952 | Kolfenbach et al. |
| 2,644,809 A | 7/1953 | Saylor et al. |
| 2,913,446 A | 11/1959 | Cull et al. |
| 2,952,669 A | 9/1960 | Bro et al. |
| 3,056,771 A | 10/1962 | Aldridge et al. |
| 3,269,972 A | 8/1966 | Banks et al. |
| 3,331,822 A | 7/1967 | Kometani et al. |
| 3,397,166 A | 8/1968 | Schmidle et al. |
| 3,440,219 A | 4/1969 | Wolff et al. |
| 3,470,143 A * | 9/1969 | Schrage et al. ........... 526/206 |
| 3,493,530 A | 2/1970 | Sianesi et al. |
| 3,528,954 A | 9/1970 | Carlson et al. |
| 3,590,025 A | 6/1971 | Tittle |
| 3,616,371 A | 10/1971 | Ukihashi et al. |
| 3,642,742 A | 2/1972 | Carlson |
| 3,787,379 A | 1/1974 | Ferren et al. |
| 3,919,183 A | 11/1975 | Jager et al. |
| 3,996,281 A | 12/1976 | Huber-Emden et al. |
| 4,016,342 A | 4/1977 | Wagensommer |
| 4,042,634 A | 8/1977 | Cope et al. |
| 4,100,225 A | 7/1978 | Mueller |
| 4,123,602 A | 10/1978 | Ukihashi et al. |
| 4,166,165 A | 8/1979 | Hisasue et al. |
| 4,194,073 A | 3/1980 | McDaniel |
| 4,338,237 A | 7/1982 | Sulzbach et al. |
| 4,357,448 A | 11/1982 | Tsubaki et al. |
| 4,373,093 A | 2/1983 | Olson et al. |
| 4,381,387 A | 4/1983 | Sulzbach |
| 4,424,324 A | 1/1984 | Throckmorton et al. |
| 4,435,553 A | 3/1984 | Throckmorton et al. |
| 4,452,960 A | 6/1984 | Throckmorton |

(Continued)

FOREIGN PATENT DOCUMENTS

EP          0 089 691          9/1983

(Continued)

OTHER PUBLICATIONS

U.S. Appl. No. 11/285,264, filed Nov. 22, 2005, Iaccino et al.
"A Low-Energy Solvent Separation Method," T. G. Gutowski et al., Polymer Engineering; "Solvents" by C. A. Irani et al., Journal of Applied Polymer Science vol. 31, 1879-1899 (1986).
"Separating Polymer Solutions with Supercritical Fluids," Mark A. McHugh et al., Macromolecules 1985, 18, 674- 680.
"Critical dynamics and phase-separation kinetics in dynamically asymmetric binary fluids: New dynamic universality class for polymer mixtures or dynamic crossover?," Hajime Tanaka, Journal of Chemical Physics 100 (7), Apr. 1, 1994, 5323-5337.

(Continued)

*Primary Examiner*—Ling-Siu Choi
*Assistant Examiner*—Frances Tischler
(74) *Attorney, Agent, or Firm*—Catherine L. Bell

(57) ABSTRACT

This invention relates to a process comprising contacting an polymerization reactor effluent with a fluorinated hydrocarbon and thereafter recovering olefin polymer, where the fluorinated hydrocarbon is present at 5 volume % to 99 volume % based upon the volume of the effluent and the fluorinated hydrocarbon, and where the polymerization is a continuous polymerization of at least 75 mole % of hydrocarbon monomers, based upon the total moles of monomer present in the reactor.

57 Claims, No Drawings

U.S. PATENT DOCUMENTS

| | | | |
|---|---|---|---|
| 4,499,249 A | 2/1985 | Nakagawa et al. |
| 4,508,881 A | 4/1985 | Throckmorton |
| 4,535,136 A | 8/1985 | Wheland |
| 4,588,790 A | 5/1986 | Jenkins, III et al. |
| 4,588,796 A | 5/1986 | Wheland |
| 4,626,608 A | 12/1986 | Scherer, Jr. et al. |
| 4,736,004 A | 4/1988 | Scherer, Jr. et al. |
| 4,900,777 A | 2/1990 | Ball et al. |
| 4,946,936 A | 8/1990 | Moggi et al. |
| 4,948,844 A | 8/1990 | Nakahara et al. |
| 4,950,724 A | 8/1990 | Malanga et al. |
| 5,032,656 A | 7/1991 | Mares et al. |
| 5,105,047 A | 4/1992 | Waller |
| 5,135,998 A | 8/1992 | Mares et al. |
| 5,182,342 A | 1/1993 | Feiring et al. |
| 5,281,680 A | 1/1994 | Grot |
| 5,286,822 A | 2/1994 | Krespan et al. |
| 5,310,870 A | 5/1994 | Peavy |
| 5,352,749 A | 10/1994 | DeChellis et al. |
| 5,405,922 A | 4/1995 | DeChellis et al. |
| 5,459,212 A | 10/1995 | Krespan et al. |
| 5,478,905 A | 12/1995 | Anolick et al. |
| 5,494,984 A | 2/1996 | Funaki et al. |
| 5,552,500 A | 9/1996 | Peavy |
| 5,556,821 A | 9/1996 | Aida et al. |
| 5,608,002 A | 3/1997 | Kubo et al. |
| 5,624,878 A | 4/1997 | Devore et al. |
| 5,663,251 A | 9/1997 | Kato et al. |
| 5,663,255 A | 9/1997 | Anolick et al. |
| 5,665,838 A | 9/1997 | Peavy |
| 5,668,250 A | 9/1997 | Malik |
| 5,668,251 A | 9/1997 | Malik et al. |
| 5,674,957 A | 10/1997 | DeSimone et al. |
| 5,688,838 A | 11/1997 | Abusleme et al. |
| 5,703,194 A | 12/1997 | Malik et al. |
| 5,769,927 A | 6/1998 | Gottschlich et al. |
| 5,780,565 A | 7/1998 | Clough et al. |
| 5,789,504 A | 8/1998 | Ihara et al. |
| 5,807,977 A | 9/1998 | Malik et al. |
| 5,821,311 A | 10/1998 | Mosbach et al. |
| 5,872,198 A | 2/1999 | Mosbach et al. |
| 5,939,501 A | 8/1999 | DeSimone et al. |
| 5,939,502 A | 8/1999 | DeSimone et al. |
| 5,959,050 A | 9/1999 | Mosbach et al. |
| 5,981,673 A | 11/1999 | DeSimone et al. |
| 5,990,251 A | 11/1999 | Gelus |
| 6,037,483 A | 3/2000 | Malik et al. |
| 6,096,840 A | 8/2000 | Bernier et al. |
| 6,107,423 A | 8/2000 | Wheland et al. |
| 6,111,062 A | 8/2000 | Shirota et al. |
| 6,133,389 A | 10/2000 | Anolick et al. |
| 6,225,367 B1 | 5/2001 | Chaouk et al. |
| 6,228,963 B1 | 5/2001 | Wheland et al. |
| 6,271,319 B1 | 8/2001 | Baker et al. |
| 6,306,989 B1 | 10/2001 | Bloom et al. |
| 6,335,408 B1 | 1/2002 | Russo et al. |
| 6,337,373 B1 | 1/2002 | Formaro et al. |
| 6,346,587 B1 | 2/2002 | Krüger et al. |
| 6,372,838 B1 | 4/2002 | Rao et al. |
| 6,380,351 B1 | 4/2002 | Malik et al. |
| 6,399,729 B1 | 6/2002 | Farnham et al. |
| 6,417,314 B1 | 7/2002 | Malik et al. |
| 6,423,798 B2 | 7/2002 | Wheland et al. |
| 6,448,368 B1 | 9/2002 | Malik et al. |
| 6,455,650 B1 | 9/2002 | Lipian et al. |
| 6,469,116 B2 | 10/2002 | Maccone et al. |
| 6,469,185 B1 | 10/2002 | Russo et al. |
| 6,486,280 B1 | 11/2002 | Anolick et al. |
| 6,534,613 B2 | 3/2003 | Ford et al. |
| 2001/0012880 A1 | 8/2001 | Wheland et al. |
| 2001/0018144 A1 | 8/2001 | Watakabe et al. |
| 2002/0002219 A1 | 1/2002 | Bloom et al. |
| 2002/0028884 A1 | 3/2002 | Formaro et al. |
| 2002/0032291 A1 | 3/2002 | Farnham et al. |
| 2002/0052454 A1 | 5/2002 | Lipian et al. |
| 2002/0055580 A1 | 5/2002 | Lorah et al. |
| 2002/0055581 A1 | 5/2002 | Lorah et al. |
| 2002/0055599 A1 | 5/2002 | Slone |
| 2002/0065383 A1 | 5/2002 | Maccone et al. |
| 2002/0086908 A1 | 7/2002 | Chou et al. |
| 2002/0128411 A1 | 9/2002 | Navarrini et al. |
| 2002/0132910 A1 | 9/2002 | Rao et al. |
| 2002/0151664 A1 | 10/2002 | Farnham et al. |
| 2002/0183457 A1 | 12/2002 | Hintzer et al. |
| 2002/0183471 A1 | 12/2002 | Russo et al. |
| 2003/0023013 A1 | 1/2003 | Lipian et al. |
| 2003/0199645 A1* | 10/2003 | Kendrick et al. .............. 526/64 |

FOREIGN PATENT DOCUMENTS

| | | |
|---|---|---|
| EP | 0 076 511 | 1/1986 |
| EP | 0 271 243 | 10/1991 |
| EP | 0 369 727 | 2/1994 |
| EP | 0 459 320 | 8/1995 |
| EP | 1 323 746 | 7/2003 |
| EP | 1 347 001 | 4/2006 |
| JP | 61007307 | 1/1986 |
| JP | 7033821 B | 2/1995 |
| JP | 11349606 A | 12/1999 |
| RU | 2195465 | 12/2002 |
| WO | WO92/12182 | 7/1992 |
| WO | WO94/17109 | 8/1994 |
| WO | WO96/24625 | 8/1996 |
| WO | WO96/33227 | 10/1996 |
| WO | WO98/34967 | 8/1998 |
| WO | WO00/47641 | 8/2000 |
| WO | WO00/50209 | 8/2000 |
| WO | WO00/53682 | 9/2000 |
| WO | WO01/49757 | 7/2001 |
| WO | WO01/49758 | 7/2001 |
| WO | WO01/49760 | 7/2001 |
| WO | WO02/04120 | 1/2002 |
| WO | WO02/34794 | 5/2002 |
| WO | WO02/051875 | 7/2002 |
| WO | WO02/059161 | 8/2002 |
| WO | WO2005/113610 | 12/2005 |
| WO | WO2005/113615 | 12/2005 |
| WO | WO2006/002132 | 1/2006 |
| WO | WO2006/009942 | 1/2006 |
| WO | WO2006/009944 | 1/2006 |
| WO | WO2006/009945 | 1/2006 |
| WO | WO2006/009946 | 1/2006 |
| WO | WO2006/009949 | 1/2006 |
| WO | WO2006/009951 | 1/2006 |
| WO | WO2006/009976 | 1/2006 |
| WO | WO2006/009977 | 1/2006 |
| WO | WO2006/009979 | 1/2006 |
| WO | WO2006/009980 | 1/2006 |
| WO | WO2006/009981 | 1/2006 |
| WO | WO2006/019494 | 2/2006 |
| WO | WO2006/025917 | 3/2006 |
| WO | WO2006/028549 | 3/2006 |
| WO | WO2006/083303 | 8/2006 |

OTHER PUBLICATIONS

"Short Chain Branching Effect on the Cloud-Point Pressures of Ethylene Copolymers in Subcritical and Supercritical Propane," S. J. Han et al., Macromolecules 1998, 31, 2533-2538.

"Designing Solvent Solutions," Chemical & Engineering News, Oct. 13, 2003, vol. 81, No. 41.

"Polymer Synthesis Using Hydrofluorocarbon Solvents," Colin Wood et al., Macromolecules, vol. 35, No. 18, 6743-6746, 2002.

"Perfluorinated polyethers for the immobilisation of homogeneous nickel catalysts," W. Keim et al., Journal of Molecular Catalysis A: Chemical 139 (1999) 171-175.

"An Improved Gas-Phase Polypropylene Process," Ross et al., *Ind. Eng. Chem. Prod. Res. Dev.* 1985, 24, 149-154.

"Adsorption of 1,1,1,2-Tetrafluoroethane on Activated Charcoal," Basavaraj S. Akkimaradi et al., J. Chem. Eng. Data 2001, 46, 417-422.

* cited by examiner

US 7,858,736 B2

POLYMER RECOVERY METHOD

PRIORITY CLAIM

This application is the national phase entry into the United States Patent Office of international application number PCT/US2005/021654 filed Jun. 20, 2005, which claims benefit of and priority to U.S. Provisional Patent Application Ser. No. 60/581,524 filed Jun. 21, 2004.

FIELD OF THE INVENTION

This invention relates to recovery of polymer from polymerization reactor effluent streams using fluorinated hydrocarbons.

BACKGROUND OF THE INVENTION

Unsaturated monomers, particularly olefin monomers, are polymerized in a variety of polymerization processes using a wide variety of monomer feeds to make a polymeric product. The polymerization reaction can be carried out using a wide variety of reactors, catalysts, and a wide variety of monomer feeds. Often, liquids, diluents or solvents are used in these polymerization reaction processes for various reasons such as to increase the efficiency of the polymerization reaction and recovery of polymer product. Polymer production at commercial scale typically results in the production of a polymer product having significant amounts of dissolved (or solubilized) hydrocarbon material such as unreacted monomer, as well as various levels of liquids, solvents, diluents, catalysts and other by-products and/or non-reactive components. The typical commercial polymerization processes used for olefin polymerization include gas phase, slurry phase, solution phase, and bulk phase. Gas phase polymerizations are those where the monomers are present, typically with a condensing fluid such as pentane, as a fluidizing gas and are contacted with a catalyst system, typically supported on silica, to form solid particles of polymer which are drawn out. These particles must then typically be treated or otherwise processed to remove unreacted monomers, condensing liquids, etc. Similarly, slurry phase polymerizations also tend to take place in the presence of a diluent. In slurry phase polymerizations, the catalyst may or may not be soluble in the diluent (and may or may not be supported), but the monomer typically is soluble in the diluent. As the monomer contacts the catalyst system polymer forms and separates out into another phase. Often it is said that the polymer precipitates out of the diluent. The polymer/diluent combination (also called the "slurry") is then withdrawn from the reactor and steps are taken to separate the polymer from the residual monomers, diluents, etc. Similarly in bulk phase polymerizations, an excess of monomer to be polymerized is used as the diluent. Thus when the polymer forms and precipitates, there is often a fair amount of unreacted monomer solubilized in the polymer. As a consequence, when these polymer/monomer combinations exit the reactor, they too often need to be treated or processes to remove unreacted monomers, diluents, etc. Finally, in solution phase processes, unlike gas and slurry phase processes, the polymer is soluble in the reaction medium. Thus, when polymer is drawn out of a solution phase reactor, it is often subjected to several complicated treatments or processes to remove the solvent, unreacted monomers, and the like. With respect to solution phase processes in particular, the polymerization reaction mixture containing the polymer, solvent, and unreacted components typically passes from the polymerization reactor to a finishing section in which polymer, solvent and unreacted monomer are separated. In the course of finishing, solvent and unreacted monomer are progressively removed from the polymerization mixture until the polymer can be formed into a solid pellet or bale. The separated solvent and monomer are then typically recycled to the polymerization reactor.

Separation and recovery of the polymer product from such a mixture of components (e.g. unreacted monomer, as well as various levels of liquids, solvents, diluents, catalysts and other by-products and/or non-reactive components) typically involves passing the polymer product withdrawn from the polymerization reactor into purge bins, with nitrogen typically introduced into the purge bin to remove the undesirable materials from the polymer product. Conventionally, the nitrogen and undesirable material are vented or sent to a flare system as a waste stream. Other methods to remove these components include passing the material through sequential pressure vessels at progressively lower pressures. The lower pressure causes the unreacted monomers, solvents, diluents, and the like to desorb from the polymer as a mixed gas stream, which can be drawn off from the vessel and typically recycled.

Separation of solvents and unreacted monomer from the polymer is an important factor in any commercial polymerization process. For example, devolatilizing the solvent from the solution by steam stripping can be very energy-intensive because the solvent can be as much as 95 weight % of the solution. In certain solution polymerization processes, such as the production of ethylene/propylene copolymers, the cost of this separation could be up to 10% of the final product cost. Hence, improvements in the polymer recovery process could lead to substantial savings in the total product cost. Forcing a single-phase polymer solution to separate into two liquid equilibrium phases offers an alternative to steam stripping. A miscible polymer solution will separate into a polymer-rich phase and a polymer lean (solvent-rich) phase if a combination of temperature and/or pressure change results in the system crossing the upper or lower critical solution boundary region as shown on the isopleth (phase transition diagram.). The phase separation is controlled by the chemical nature of the components, their molecular sizes (especially the molecular weight of the polymer), and the critical temperature and critical pressure of the solvent mixture. The phase separation is encouraged by higher temperature and/or lower pressure in some systems and by higher pressure in others. Appropriate selection of polymerization solvent, monomer conversion, especially of the volatile monomers, temperatures, and pressures is required to induce phase separation. Some articles explaining the general principles are: "A low-energy Solvent Separation Method," by T. G. Gutowski et al, Polymer Engineering; "Solvents" by C. A. Irani et al. in Journal of Applied Polymer Science Vol 31, 1879-1899 (1986); "Separating Polymer Solutions with Supercritical Fluids," by Mark A. McHugh et al in Macromolecules 1985, 18, 674-680; "Critical Dynamics and Phase Separation Kinetics . . . ," by Hajime Tanaka in Journal of Chemical Physics 100 (7) Apr. 1, 1994 p 5323-5337; "Short Chain Branching Effect on the Cloud Point Pressures of Ethylene Copolymers etc.," by S. J. Han et al. in Macromolecules 1998, 31, 2533-2538.

For most solution processes, there is significant difference between the reaction conditions (temperature and pressure) and the critical conditions required for phase separation. Therefore, it is often necessary to heat the reactor effluent to the critical temperature or above to achieve phase separation. This extra step involves additional equipment, and more energy consumption as well as operational complexity, and risks polymer degradation a the higher temperatures.

Thus it is desirable to provide a more efficient polymer recovery system. This invention provides such improved polymer recovery method by, among other things, using fluorocarbon in the recovery processes.

U.S. Pat. No. 5,769,927 (Gottschlich et al.) discloses a process for treating material that is to be vented or purged from a polymer manufacturing operation using a three step separation technique. The technique includes condensation, flash evaporation and membrane separation to remove components such as ethylene, propylene and nitrogen. U.S. Pat. No. 6,271,319 (Baker et al.) discloses a polypropylene manufacturing process that includes using a gas separation membrane to separate propylene from propane in a reactor vent stream. The separated propylene is circulated back to the polymerization reactor as feed.

Fluorinated hydrocarbons have been previously used in polymerization processes including:

U.S. Pat. No. 3,470,143 discloses a process to produce a boiling-xylene soluble polymer in a slurry using certain fluorinated organic carbon compounds.

U.S. Pat. No. 5,990,251 discloses a gas phase process using a Ziegler-Natta catalyst system modified with a halogenated hydrocarbon, such as chloroform.

EP 0 459 320 A2 discloses polymerization in polar aprotic solvents, such as halogenated hydrocarbons.

U.S. Pat. No. 5,780,565 discloses dispersion polymerizations of polar monomers under super-atmospheric conditions such that the fluid is a liquid or supercritical fluid, the fluid being carbon dioxide, a hydrofluorocarbon, a perfluorocarbon or a mixture thereof.

U.S. Pat. No. 5,624,878 discloses the polymerization using "constrained geometry metal complexes" of titanium and zirconium.

U.S. Pat. No. 2,534,698, U.S. Pat. No. 2,644,809 and U.S. Pat. No. 2,548,415 disclose preparation of butyl rubber type elastomers in fluorinated solvents.

U.S. Pat. No. 6,534,613 discloses use of hydrofluorocarbons as catalyst modifiers.

U.S. Pat. No. 4,950,724 disclose the polymerization of vinyl aromatic monomers in suspension polymerization using fluorinated aliphatic organic compounds.

WO 02/34794 discloses free radical polymerizations in certain hydrofluorocarbons.

WO 02/04120 discloses a fluorous bi-phasic systems.

WO 02/059161 discloses polymerization of isobutylene using fluorinated co-initiators.

EP 1 323 746 shows loading of biscyclopentadienyl catalyst onto a silica support in perfluorooctane and thereafter the prepolymerization of ethylene at room temperature.

U.S. Pat. No. 3,056,771 discloses polymerization of ethylene using $TiCl_4/(Et)_3Al$ in a mixture of heptane and perfluoromethylcyclohexane, presumably at room temperature, further a mixture of 30% perfluoromethylcyclohexane in heptane was used to cause the polymer in the slurry to float.

Additional references of interest include:

Designing Solvent Solutions, Chemical and Engineering News, Oct. 13, 2003 (www.CEN-online.org); Polymer Synthesis Using Hydrofluorocarbon Solvents., Wood, Colin, et al. Macromolecules, Vol. 35, Number 18, pages 6743-6746, 2002; Perfluorinated Polyethers for the Immobilisation of Homogeneous Nickel Catalysts, Keim, W. et al., Journal of Molecular Catalysis A: Chemical 139 (1999) 171-175; RU2195465; US20020086908 A1; WO200251875 A1; US2002/0032291 A1; U.S. Pat. No. 3,397,166; U.S. Pat. No. 3,440,219; U.S. Pat. No. 6,111,062; U.S. Pat. No. 5,789,504; U.S. Pat. No. 5,703,194; U.S. Pat. No. 5,663,251; U.S. Pat. No. 5,608,002; U.S. Pat. No. 5,494,984; U.S. Pat. No. 5,310,870; U.S. Pat. No. 5,182,342; U.S. Pat. No. 2,603,626; U.S. Pat. No. 2,494,585; U.S. Pat. No. 2,474,571; WO 02/051875 A1; U.S. Pat. No. 6,133,389; U.S. Pat. No. 6,096,840; U.S. Pat. No. 6,107,423; U.S. Pat. No. 6,037,483; U.S. Pat. No. 5,981,673; U.S. Pat. No. 5,939,502; U.S. Pat. No. 5,939,501; U.S. Pat. No. 5,674,957; U.S. Pat. No. 5,872,198; U.S. Pat. No. 5,959,050; U.S. Pat. No. 5,821,311; U.S. Pat. No. 5,807,977; U.S. Pat. No. 5,688,838; U.S. Pat. No. 5,668,251; U.S. Pat. No. 5,668,250; U.S. Pat. No. 5,665,838; U.S. Pat. No. 5,663,255; U.S. Pat. No. 5,552,500; U.S. Pat. No. 5,478,905; U.S. Pat. No. 5,459,212; U.S. Pat. No. 5,281,680; U.S. Pat. No. 5,135,998; U.S. Pat. No. 5,105,047; U.S. Pat. No. 5,032,656; U.S. Pat. No. 4,166,165; U.S. Pat. No. 4,123,602; U.S. Pat. No. 4,100,225; U.S. Pat. No. 4,042,634; US 2002/0132910 A1; US 2002/0151664 A1; US 2002/0183457 A1; US 2002/0183471 A1; US 2003/0023013 A1; US 2001/0012880 A1; US 2001/0018144 A1; US 2002/0002219 A1; US 2002/0028884 A1; US 2002/0052454 A1; US 2002/0055580 A1; US 2002/0055581; US 2002/0055599 A1; US 2002/0065383; US 2002/0086908 A1; US 2002/0128411 A1; U.S. Pat. No. 3,269,972; U.S. Pat. No. 3,331,822; U.S. Pat. No. 3,493,530; U.S. Pat. No. 3,528,954; U.S. Pat. No. 3,590,025; U.S. Pat. No. 3,616,371; U.S. Pat. No. 3,642,742; U.S. Pat. No. 3,787,379; U.S. Pat. No. 3,919,183; U.S. Pat. No. 3,996,281; U.S. Pat. No. 4,194,073; U.S. Pat. No. 4,338,237; U.S. Pat. No. 4,381,387; U.S. Pat. No. 4,424,324; U.S. Pat. No. 4,435,553; U.S. Pat. No. 4,452,960; U.S. Pat. No. 4,499,249; U.S. Pat. No. 4,508,881; U.S. Pat. No. 4,535,136; U.S. Pat. No. 4,588,796; U.S. Pat. No. 4,626,608; U.S. Pat. No. 4,736,004; U.S. Pat. No. 4,900,777; U.S. Pat. No. 4,946,936; U.S. Pat. No. 4,948,844; WO00/50209; WO/96/24625; WO 94/17109; WO 0149760 A1; WO 01/49758 A1; WO 01/49757; WO 00/53682; WO 00/47641; U.S. Pat. No. 6,486,280 B1; U.S. Pat. No. 6,469,185 B1; U.S. Pat. No. 6,469,116 B2; U.S. Pat. No. 6,455,650 B1; U.S. Pat. No. 6,448,368 B1; U.S. Pat. No. 6,423,798 B2; EP 0 076 511 B1; EP 0 271 243 B1; U.S. Pat. No. 6,417,314 B1; U.S. Pat. No. 6,399,729 B1; U.S. Pat. No. 6,380,351 B1; U.S. Pat. No. 6,372,838 B1; U.S. Pat. No. 6,346,587 B1; U.S. Pat. No. 6,337,373 B1; U.S. Pat. No. 6,335,408 B1; U.S. Pat. No. 6,306,989 B1; U.S. Pat. No. 6,228,963 B1; U.S. Pat. No. 6,225,367 B1; JP 7033821 B published Apr. 12, 1995; JP 11349606 A published Dec. 21, 1999; and JP 61007307 published Jan. 14, 1986.

SUMMARY OF THE INVENTION

This invention relates to a method to improve a polymer recovery process by introducing fluorinated hydrocarbon into the recovery process. In particular, this invention provides an improved method for separating polymer from an effluent stream exiting from the polymerization reactor comprising adding a fluorocarbon to the effluent to cause polymer precipitation and/or to form a polymer rich phase and a polymer lean phase for further separation.

This invention also relates to a process comprising contacting an polymerization reactor effluent with a fluorinated hydrocarbon and thereafter recovering olefin polymer, where the fluorinated hydrocarbon is present at 5 volume % to 99 volume % based upon the volume of the effluent and the fluorinated hydrocarbon, and where the polymerization is a continuous polymerization of at least 75 mole % of hydrocarbon monomers, based upon the total moles of monomer present in the reactor.

DEFINITIONS

For purposes of this invention and the claims thereto, the term copolymers means any polymer comprising two or more monomers.

For the purposes of this invention and the claims thereto when a polymer is referred to as comprising a monomer, the olefin present in the polymer is the polymerized form of the monomer. Likewise when catalyst components are described as comprising neutral stable forms of the components, it is well understood by one of ordinary skill in the art, that the active form of the component is the form that reacts with the monomers to produce polymers. In addition, a reactor is any container(s) in which a chemical reaction occurs.

As used herein, the new notation numbering scheme for the Periodic Table Groups are used as set out in CHEMICAL AND ENGINEERING NEWS, 63(5), 27 (1985).

As used herein, Me is methyl, t-Bu and $^t$Bu are tertiary butyl, iPr and $^i$Pr are isopropyl, Cy is cyclohexyl, and Ph is phenyl.

For purposes of this disclosure, the term oligomer refers to compositions having 2-75 mer units and the term polymer refers to compositions having 76 or more mer units. A mer is defined as a unit of an oligomer or polymer that originally corresponded to the monomer(s) used in the oligomerization or polymerization reaction. For example, the mer of polyethylene would be ethylene.

DETAILED DESCRIPTION

In one aspect this invention relates to the concept that fluorinated hydrocarbons ("FC's") can be used to improve post polymerization reactor processes, including polymer recovery and polymer processing. In particular fluorinated hydrocarbons can be used to improve polymer recovery by improving separation of the polymer from the other reaction components, such as unreacted monomer, solvents, diluents and the like.

In particular this invention relates to a process to devolatilize a polymerization reactor effluent comprising contacting the effluent with a fluorinated hydrocarbon. This invention also relates to a process to reduce agglomeration in a polymerization reactor effluent comprising contacting the effluent with a fluorinated hydrocarbon. This invention also relates to a process to reduce accumulation of polymer on surfaces of processing equipment from a polymerization reactor effluent comprising contacting the effluent with a fluorinated hydrocarbon. This invention also relates to a process to precipitate polymer from a polymerization reactor effluent comprising contacting the effluent with a fluorinated hydrocarbon. This invention also relates to a process to separate polymer from a polymerization reactor effluent comprising contacting the effluent with a fluorinated hydrocarbon.

These methods can be practiced on the reactor effluent of any olefin polymerization system, regardless of whether or not fluorinated hydrocarbon(s) are used in the polymerization medium itself. In one embodiment the polymerization process is conducted without FC present and the FC is added to the polymerization effluent after the polymerization reaction has stopped, either just before exiting the reactor or after exiting the reactor. In another embodiment the polymerization process is conducted in the presence of fluorocarbon and additional fluorocarbon (which may be the same or different from the first fluorocarbon) is added to the polymerization reactor effluent after the polymerization reaction has exited the reactor and or after the polymerization reaction has stopped. In another embodiment the polymerization process is conducted with fluorocarbon present and additional fluorocarbon (which may be the same or different) is added to the polymerization reactor effluent just before exiting the reactor.

In a preferred embodiment, the fluorocarbons are present in the polymerization effluent at 1 to 99 volume %, preferably 5 to 99 volume %, based upon the volume of the effluent and the fluorocarbon, preferably the fluorocarbons are present at 10 to 80 volume %, preferably 20 to 50 volume %, more preferably at 25 to 50 volume %, more preferably 30 to 40 volume %. For purposes of this invention and the claims thereto polymerization reactor effluent means the mixture of unreacted monomers, solvent/diluent, and polymers produced exiting the polymerization reactor.

The FC is typically injected into the effluent stream after exiting the reactor and prior to the first treatment vessel, however it is not required. The FC may be introduced anywhere along the recovery process, such as after the first flash vessel, after a distillation column, etc. Most polymer recovery processes involve the use of one or more settling tanks and or flash tanks and or purge vessels. Settling tanks are typically employed in slurry production processes. They are enclosed vessels that allow the polymer granules time to "settle" to the bottom while allowing the lighter elements (such as the unreacted monomers) time to rise to the top and be drawn off. Introduction of FC into the reactor polymerization effluent prior to introduction into a settling tank will have the benefits of reducing unwanted agglomeration of the granular polymer particles and reducing (or eliminating) accumulation of polymer on the internal surfaces of the settling tank and other processing equipment located downstream of the settling tank. Preferably the FC is thoroughly mixed with the reactor polymerization effluent.

Likewise, introduction of FC directly into a settling tank (separately from the reactor effluent) will have the benefits of reducing unwanted agglomeration of the granular polymer particles and reducing (or eliminating) the accumulation of polymer on the internal surfaces of the settling tank. Preferably the settling tank has sufficiently good internal agitation to ensure good mixing of the FC with the reactor effluent material.

A flash tank is pressure vessel that is used to subject the reactor polymerization effluent to a rapid pressure drop to cause the release of the lighter components (unreacted monomer, diluents, solvents, etc.) from the polymer product. These tanks are commonly employed in all types of polymer production processes, including slurry, gas phase, and solution. Introduction of FC into the reactor polymerization effluent prior to introduction into a flash tank will provide the benefit of enhanced efficiency of the flash process. The efficiency is enhanced because the HFC induces a phase separation in the reactor effluent material. The polymer lean phase created by the phase separation is more easily flashed (or vaporized) in the flash tank. In addition, the HFC can reduce the rate of film formation on the internal surfaces of the flash tank. Film formation can be a significant problem in the commercial production of relatively low density (low crystallinity) polymer products. Preferably the HFC is well mixed with the reactor effluent stream prior to its introduction to the flash tank.

Likewise, introduction of FC directly into a flash tank (separately from the reactor effluent) will provide the benefits of enhanced efficiency of the flash process and reduced rates of film formation on the internal surfaces of the flash tank.

Preferably the FC is introduced into the flash tank in a manner that ensures relatively good mixing with the reactor effluent material. The mixing can be accomplished by introducing the FC into the bottom of the flash tank so that it passes upward through the polymer product.

A purge vessel is a relatively low pressure vessel where the reactor polymerization effluent is exposed to another gas, typically nitrogen, that is passed through the effluent stream and forces the lighter components (unreacted monomer, diluents, solvents, etc.) out of the polymer. Purge vessels are commonly employed in gas phase, slurry and other "particle form" processes in which the polymer is produced in a granular form, and is therefore relatively permeable to the flow of purge gas. Introduction of FC into the reactor polymerization effluent prior to introduction into a purge vessel will have the benefit of increasing the rate of desorption of residual hydrocarbons from the product. This is especially important when relatively high molecular weight comonomers such as 1-hexene or 1-octene that are employed in the reaction process (and are incorporated in the polymer). These higher molecular weight comonomers are known to be highly soluble in the polymer product, and desorb relatively slowly from the product. Increasing the rate of desorption from the granular resin product will improve the overall efficiency of the desorption process and thereby reduce the total concentration of residual hydrocarbons in the product.

Likewise, introduction of FC directly into a purge vessel (separately from the reactor effluent) will have the benefit of increasing the rate of desorption of residual hydrocarbons from the product. In this case, with FC introduced directly into a purge vessel, it is preferred that the FC is well mixed with the purging gas flowing through the polymer product. Preferably, the mixing is accomplished by introducing the FC into the bottom of the vessel (along with the purging gas) so that it passes upward through the polymer product.

Particular fluorinated hydrocarbons for particular process will typically be chosen on the basis of their ability to influence precipitation, at specific temperature and pressure conditions, of the polymer being produced.

Preferred fluorinated hydrocarbons for use in this invention include perfluorocarbon ("PFC" or "PFC's") or a hydrofluorocarbon ("HFC" or "HFC's"), collectively referred to as "fluorinated hydrocarbons" or "fluorocarbons" ("FC" or "FC's"). Fluorocarbons are defined to be compounds consisting essentially of at least one carbon atom and at least one fluorine atom, and optionally hydrogen atom(s). A perfluorocarbon is a compound consisting essentially of carbon atom and fluorine atom, and includes for example linear branched or cyclic, $C_1$ to $C_{40}$ perfluoroalkanes. A hydrofluorocarbon is a compound consisting essentially of carbon, fluorine and hydrogen. Preferred FC's include those represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y is greater than or equal 0 and z is an integer and at least one, more preferably, y and z are integers and at least one. Preferred perfluorocarbons include those where y is zero and where x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, and z is an integer and at least one. In a preferred embodiment, z is 2 or more. For purposes of this invention and the claims thereto, the terms hydrofluorocarbon and fluorocarbon do not include chlorofluorocarbons.

In one embodiment, a mixture of fluorocarbons are used in the process of the invention, preferably a mixture of a perfluorinated hydrocarbon and a hydrofluorocarbon, and more preferably a mixture of a hydrofluorocarbons. In yet another embodiment, the hydrofluorocarbon is balanced or unbalanced in the number of fluorine atoms in the HFC used.

Non-limiting examples of fluorocarbons useful in this invention include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane; 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. Particularly preferred fluorocarbons include difluoromethane, trifluoromethane, 1,1-difluoroethane, 1,1,1-trifluoroethane, fluoromethane, and 1,1,1,2-tetrafluoroethane. In addition to those fluorocarbons described herein, those fluorocarbons described in Raymond Will, et. al., CEH Marketing Report, Fluorocarbons, Pages 1-133, by the Chemical Economics Handbook-SRI International, April 2001, which is fully incorporated herein by reference, are included.

In another preferred embodiment, the fluorocarbon(s) used in the process of the invention are selected from the group consisting of difluoromethane, trifluoromethane, 1,1-difluoroethane, 1,1,1-trifluoroethane, and 1,1,1,2-tetrafluoroethane and mixtures thereof.

In one particularly preferred embodiment, the commercially available fluorocarbons useful in the process of the invention include HFC-236fa having the chemical name 1,1,1,3,3,3-hexafluoropropane, HFC-134a having the chemical name 1,1,1,2-tetrafluoroethane, HFC-245fa having the chemical name 1,1,1,3,3-pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane.

In another embodiment, the fluorocarbon is not a perfluorinated hydrocarbon. In another embodiment, the fluorocarbon is not a perfluorinated C4 to C10 alkane. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons.

In another embodiment the fluorocarbon is present at more than 1 weight %, based upon the weight of the fluorocarbon and any hydrocarbon solvent present in the effluent, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the effluent, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the effluent.

In another embodiment the fluorocarbon, preferably the hydrofluorocarbon, is present at more than 1 volume %, based upon the total volume of the fluorocarbon and any hydrocarbon solvent present in the effluent, preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an FC's does not influence the polymerization reactions, in fact, it may do so to some extent, such as affecting activity rates. However, it is meant to say that the FC's are not present as part of the catalyst system.)

In another embodiment the fluorocarbon is a blend of hydrofluorocarbon and perfluorocarbon and preferably the hydrofluorocarbon is present at more than 1 volume %, based upon the total volume of the perfluorocarbon and the hydrofluorocarbon present in the reactor, (with the balance being made up by the perfluorocarbon) preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In yet another embodiment, the fluorocarbons of the invention have a weight average molecular weight (Mw) greater than 30 a.m.u., preferably greater than 35 a.m.u, and more preferably greater than 40 a.m.u. In another embodiment, the fluorocarbons of the invention have a Mw greater than 60 a.m.u, preferably greater than 65 a.m.u, even more preferably greater than 70 a.m.u, and most preferably greater than 80 a.m.u. In still another embodiment, the fluorocarbons of the invention have a Mw greater than 90 a.m.u, preferably greater than 100 a.m.u, even more preferably greater than 135 a.m.u, and most preferably greater than 150 a.m.u. In another embodiment, the fluorocarbons of the invention have a Mw greater than 140 a.m.u, preferably greater than 150 a.m.u, more preferably greater than 180 a.m.u, even more preferably greater than 200 a.m.u, and most preferably greater than 225 a.m.u. In an embodiment, the fluorocarbons of the invention have a Mw in the range of from 90 a.m.u to 1000 a.m.u, preferably in the range of from 100 a.m.u to 500 a.m.u, more preferably in the range of from 100 a.m.u to 300 a.m.u, and most preferably in the range of from about 100 a.m.u to about 250 a.m.u.

In yet another embodiment, the fluorocarbons of the invention have normal boiling point in the range of from about −100° C. up to the polymerization temperature, preferably up to about 70° C., preferably up to about 85 to 115° C., preferably the normal boiling point of the fluorocarbons is in the range of from −80° C. to about 90° C., more preferably from about −60° C. to about 85° C., and most preferably from about −50° C. to about 80° C. In an embodiment, the fluorocarbons of the invention have normal boiling point greater than −50° C., preferably greater than −50° C. to less than −10° C. In a further embodiment, the fluorocarbons of the invention have normal boiling point greater than −5° C., preferably greater than −5° C. to less than −20° C. In one embodiment, the fluorocarbons of the invention have normal boiling point greater than 10° C., preferably greater than 10° C. to about 60° C.

In another embodiment, the fluorocarbons of the invention have a liquid density @ 20° C. (g/cc) less than 2 g/cc, preferably less than 1.6, preferably less than 1.5 g/cc, preferably less than 1.45 g/cc, preferably less than 1.40, and most preferably less than 1.20 g/cc.

In one embodiment, the fluorocarbons of the invention have a ΔH Vaporization at the normal boiling point as measured by standard calorimetry techniques in the range between 100 kJ/kg to less than 500 kJ/kg, preferably in the range of from 110 kJ/kg to less than 450 kJ/kg, and most preferably in the range of from 120 kJ/kg to less than 400 kJ/kg.

In another preferred embodiment, the fluorocarbons of the invention have any combination of two or more of the aforementioned Mw, normal boiling point, ΔH Vaporization, and liquid density values and ranges. In a preferred embodiment, the fluorocarbons useful in the process of the invention have a Mw greater than 30 a.m.u, preferably greater than 40 a.m.u, and a liquid density less than 2.00 g/cc, preferably less than 1.8 g/cc. In yet another preferred embodiment, the fluorocarbons useful in the process of the invention have a liquid density less than 1.9 g/cc, preferably less than 1.8 g/cc, and a normal boiling point greater than −100° C., preferably greater than −50° C. up to the polymerization temperature of the process, (such as up to 115° C.), preferably less than 100° C., and more preferably less than 90° C., and most preferably less than 60° C., and optionally a ΔH Vaporization in the range from 120 kj/kg to 400 kj/kg.

In another embodiment the fluorocarbons are used in combination with one or more hydrocarbon solvents. Preferably, the hydrocarbon solvent is an aliphatic or aromatic hydrocarbon fluids. Examples of suitable, preferably inert, solvents include, for example, saturated hydrocarbons containing from 1 to 10, preferably 3 to 8 carbon atoms, preferably C1 to C8 alkanes, such as propane, n-butane, isobutane, mixed butanes, pentane, n-pentane, isopentane, neopentane, hexane, n-hexane, isohexane, cyclohexane, octane, isooctane, and other saturated $C_6$ to $C_8$ hydrocarbons. Preferred hydrocarbon fluids also include desulphurized light virgin naphtha. Likewise one may also use mixtures of C3 to C20 paraffins and isoparaffins, preferably paraffinic/isoparrifinic mixtures of C4, C5 and or C6 alkanes.

In another embodiment, the fluorinated hydrocarbon fluid is selected based upon its solubility or lack thereof in a particular polymer being produced. Preferred fluorocarbons have little to no solubility in the polymer. Solubility in the polymer is measured by forming the polymer into a film of thickness between 50 and 100 microns, then soaking it in fluorocarbon (enough to cover the film) for 4 hours at the relevant desired polymerization temperature and pressure in a sealed container or vessel. The film is removed from the fluorocarbon, exposed for 90 seconds to evaporate excess fluorocarbon from the surface of the film, and weighed. The mass uptake is defined as the percentage increase in the film weight after soaking. The fluorocarbon or fluorocarbon mixture is selected so that the polymer has a mass uptake of less than 4 wt %, preferably less than 3 wt %, more preferably less than 2 wt %, even more preferably less than 1 wt %, and most preferably less than 0.5 wt %.

In a preferred embodiment, the FC(s) or mixtures thereof, preferably, the HFC's or mixtures thereof, are selected such that the polymer melting temperature (Tm) is reduced (or depressed) by not more than 20° C. by the presence of the fluorocarbon, preferably by not more than 15° C., preferably by not more than 10° C., preferably by not more than 5° C. The depression of the polymer melting temperature ΔTm is determined by first measuring the melting temperature of a polymer by differential scanning calorimetry (DSC), and then comparing this to a similar measurement on a sample of the same polymer that has been soaked with the fluorocarbon. In general, the melting temperature of the soaked polymer will be lower than that of the dry polymer. The difference in these measurements is taken as the melting point depression ΔTm. Higher concentrations of dissolved materials in the polymer cause larger depressions in the polymer melting temperature (i.e. higher values of ΔTm). The DSC technique for determining the melting point depression is described by, P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the fluorocarbon to be evaluated) for four hours. As described in the reference above, it is important to ensure that the second part of the test, conducted in the presence of the liquid, is done in a sealed container so that the liquid is not flashed during the test, which could introduce experimental error. In one embodiment, the ΔTm is less than 12° C., preferably less than 10° C., preferably less than 8° C., more preferably less than 6° C., and most preferably less than 4° C. In another embodiment, the measured ΔTm is less than 5° C., preferably less than 4° C., more preferably less than 3° C., even more preferably less than 2° C., and most preferably less than 1° C.

In a preferred embodiment, the fluorocarbon(s) or mixtures thereof, preferably, the hydrofluorocarbon(s) or mixtures thereof, are selected such that they are miscible with the hydrocarbon solvent and liquid monomers when a mixture is used. By miscible is meant that the FC/hydrocarbon mixture will not have liquid phase separation. Liquid phase separation is determined by mixing a fluorocarbon and a hydrocarbon in a vessel with sight glass at polymerization conditions, then visually observing if phase separation occurs after vigorous mixing for five minutes.

In a preferred solution phase embodiment, FC's or mixtures of FC's are added to the effluent of the solution exiting from the reactor causing the soluble polymer to precipitate out and form a polymer rich phase and polymer lean phase for further separation in a separation zone. This method offers great potential as the temperature and pressure window of the phase separation can be fitted precisely to the desired operating pressure and temperature window and polymer-related maximum thermodynamic conditions through selection of the type of fluorocarbon and amount of fluorocarbon added. The amount of fluorocarbon added into the effluent should be sufficient to cause polymer precipitation so the effluent is separated into a polymer rich phase and a polymer lean phase. Following precipitation of the soluble polymer, it can be recovered by conventional techniques such as by conventional filtration techniques. For example, the polymer rich phase separated in a separation zone may be fed to a drying stage, where the polymer rich phase is heated, flash-dried or evaporated under a reduced pressure by means of a multi-tube type heat exchanger, a hopper or a rotary type solvent-removing device such as a thin film evaporator to remove the solvent, FC and the unreacted monomer. Likewise the solvent, FC and the unreacted monomer are recovered from the polymer lean phase, any resulting low-molecular weight polymer is removed therefrom, and the solvent, FC and unreacted monomer can be recycled to the polymerization reaction. Part or all of the polymer lean phase can be also recycled to the polymerization reactor and/or mixed with the reactor effluent drawn from the polymerization reactor, if necessary heated, and then the resulting mixture is recycled to the separation unit.

Preferred processes where this invention can be used include those typically used to produce most thermoplastic resins, i.e., polymers which become plastic and flowable under the action of pressure and heat, particularly homo- and co-polyethylene, homo- and co-polypropylene, ethylene/propylene copolymers, and the like. Preferred polyethylenes includes both homo-polyethylene and copolymers such as ethylene/butene, ethylene/hexene, and ethylene/octene.

Another preferred process where this invention can be utilized is a solution phase process to make copolymers of ethylene and alpha olefins with or without diene termonomers, particularly copolymers of ethylene and propylene and non-conjugated dienes. Preferably the polymer produced is a low-crystallinity polyolefin (less than 40% crystallinity as measured by DSC). Preferably the polymer comprises 30 to 95 mol % ethylene, preferably 45 to 93% mol %, 5 to 70% mol % alpha olefin (preferably propylene), preferably 7 to 60 mol % and 0 to 10 mol % of non-conjugated diene.

Preferred polymers which can be isolated from a solution by the methods of this invention typically have a weight average molecular weight (Mw) from 20,000 to 500,000.

Preferred polymers which can be isolated from a solution by the methods of this invention typically have a melting temperature (Tm) of 200° C. or less, as measured by DSC as follows: Differential scanning calorimetric (DSC) trace data is obtained using a TA Instruments model 2910 machine. Samples weighing approximately 7-10 mg are sealed in aluminum sample pans. The DSC data are recorded by first cooling the sample to −100° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves were measured and used to determine the heat of fusion and the degree of crystallinity. The percent crystallinity was calculated using the formula, [area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) was used as the heat of fusion for 100% crystalline polypropylene.

The methods of this invention may be used in polymerization processes that produce semi-crystalline polymers as well as in polymerization processes that produce amorphous polymers. An amorphous polymer is defined as a polymer having a crystallinity of 3% or less, as measured by DSC described above. A semi-crystalline polymer is defined as a polymer having a crystallinity of 4% or more, preferably 5% or more, preferably 10% or more, preferably 20% or more, preferably 30% or more, preferably 40% or more, preferably 50% or more.

The methods of this invention may be used in processes where the polymer is present as a particulate form in the effluent or as soluble liquid in the effluent. While the solid polymer particulate phase can interfere with the isolation of the solubilized polymer from the effluent in conventional techniques, these polymer particles take part in the recovery of soluble polymer resin from the effluent in this invention. The concentration of soluble polymer in the effluent prior to precipitation can vary widely with amounts up to 40 wt % of the total solution. Where the solution is a reaction medium of a solution polymerization process that contains polymer produced, the concentration of the polymer will depend on the extent of polymerization performed in the reaction medium. The concentration of polymer in the effluent can also vary widely and is preferably less than 30 weight % based on the weight of a total solution. The methods of this invention can be performed with levels of polymer concentration of less than 40 wt. %, based on the weight of the total solution, preferably less than 20 wt. %, more preferably less than 15 wt. %.

The effluent utilized in this invention may contain one or more hydrocarbon solvents, including "solvents" that are monomers used in excess as polymerization medium (for example bulk polymerization processes). Preferably, the hydrocarbon solvent is an aliphatic or aromatic hydrocarbon. Examples of suitable, preferably inert, solvents include, for example, desulphurized light virgin naphtha, and saturated hydrocarbons containing from 3 to 8 carbon atoms, such as propane, n-butane, isobutane, pentane, n-pentane, isopentane, neopentane, hexane, n-hexane, isohexane, mixed butanes, cyclohexane, octane, and other saturated $C_6$ to $C_8$ hydrocarbons. Likewise one may also use mixtures of C3 to C20 paraffins and isoparaffins, preferably paraffinic/isoparafinic mixtures of C4, C5 and or C6 alkanes.

The operating pressure and temperature in the polymer recovery unit(s) should be adequate so that the fluorocarbon added is in liquid phase. Higher temperatures can also enhance phase separation. Further, vigorous mixing/agitation can also enhance phase separation. The amount of mixing required will be determined by physical properties such as viscosity, interfacial tension and density differences between the two phases. Less mixing/agitation will cause the formation of larger droplets and decreases interfacial area (interfacial area varies with the square of the droplet diameter), while higher agitation/more mixing contributes to smaller droplets or emulsions and minimizes mass transfer resistance during reactions.

In another preferred embodiment, a continuous solution polymerization process is used to produce copolymers of ethylene/octene or ethylene/propylene or terpolymers of ethylene/propylene/diene, preferably using a metallocene catalyst system, in a single, or optionally two, continuous stirred tank reactors connected in series with hexane used as the solvent (and optionally toluene for the cocatalyst). The feed is transferred to the first reactor where the exothermic polymerization reaction is conducted adiabatically at a reaction temperature between about 50° C. to about 220° C. Hydrogen gas may also be added to the reactors as a further molecular weight regulator. If desired, polymer product is then transferred to the second reactor, which is also operated adiabatically at a temperature between about 50° C. to 200° C. Additional monomers, solvent, metallocene catalyst, and activators can be fed to the second reactor. The polymer content leaving the second reactor is preferably from 8 to 22 weight percent. A heat exchanger then heats the polymer solution to a temperature of about 220° C. The solution is then typically combined with one or more FC's, thoroughly mixed, and then brought to a Lower Critical Solution Temperature (LCST) liquid-liquid phase separator which causes the polymer solution to separate into two liquid phases, an upper lean phase and a lower polymer-rich phase. The upper lean phase contains about 70 weight % of the solvent and the lower polymer rich phase contains about 30 weight % polymer. Additional FC may be added and mixed into the solution. The polymer solution then enters a low pressure separator vessel which operates at a temperature of about 150° C. and a pressure of 4-10 bar (400 to 1000 kPa), and flashes the lower polymer rich phase to remove volatiles and to increase the polymer content to about 76 weight %. A gear pump at the bottom of the flash vessel drives the polymer rich solution to a LIST devolatilizer. An extruder is coupled to the end of the LIST devolatilizer whereby the polymer material is transferred to a gear pump which pushes the polymer material through a screen pack. Then the polymer is cut into pellets and fed to a water bath. A spin dryer dries the polymer pellets which have a final solvent content of less than about 0.5 weight %. Preferably a controlled amount of fluorocarbon is added to the effluent in LCST separator and/or the low pressure separator vessel. The range of fluorocarbon used is guided by a combination of:

a) The boiling point of the fluorocarbon is preferably higher than ethylene and propylene so that the FC will co-condense and recycle with the hydrocarbon solvent, if any (typically hexane). Preferably the boiling point is in the range of from 0 to 70° C. In addition the FC's preferably have an anti-solvent effect, which lowers the critical solution phase cloud point curve making for more efficient separation in the liquid-liquid separator. The FC's preferably separate with the hydrocarbon solvent in the polymer lean phase; and/or b) The extent of fluorination of the FC's is such that they form a polymer rich phase and a polymer lean phase.

Addition of fluorocarbon into the effluent makes the polymer-solvent phase separation at milder conditions (e.g., lower temperatures) when the amount of fluorocarbon added is not sufficient to induce phase separation. The process can be also simplified by replacing the LCST and associated heating unit with a conventional flash tank when sufficient amount of fluorocarbon is used.

In another embodiment, EPDM polymers are produced in stirred flow reactors of either one or more stages, preferably in a one-stage reaction system in which a monomer mixture of ethylene, higher alpha-olefin (preferably propylene) and diene is fed into a reaction vessel along with a Ziegler-Natta catalyst, a cocatalyst and aromatic hydrocarbon solvent. In conventional multi-stage reactions, the ethylene, higher alpha-olefin and non-conjugated diene are added to each reactor to maintain a relatively uniform composition of the terpolymer. One such multi-stage method is disclosed in U.S. Pat. No. 3,629,212. In a preferred embodiment, a terpolymer is prepared by (1) adding to a first reactor solvent, from about 50 to 90 percent by weight of the total ethylene charge, from about 30 to 100 percent by weight of the total higher alpha-olefin charge, from about 30 to 100 percent by weight of the total Ziegler-Natta catalyst charge, from about 30 to 100 percent by weight of the total organoaluminum cocatalyst charge and non-conjugated diene, (2) partially polymerizing a portion of the ethylene, higher alpha-olefin and diene in that first reactor to form a polymer cement (polymer dissolved in the solvent); (3) passing the reactor contents including the polymer cement from the first reactor to a second reactor connected in series with the first reactor; (4) adding ethylene to the second reactor along with an amount of non-conjugated diene such that the resultant polymerized weight percent diene content of the polymer from the first reactor is at least about 10 percent greater, on a relative basis, than the resultant polymerized weight percent diene content of the polymer from the second reactor; and (5) further polymerizing the ethylene, higher alpha-olefin and non-conjugated diene in the second reactor. From about 50 to about 100 percent by weight of the total non-conjugated diene charge is added to the first reactor, preferably from about 80 to about 100 percent and most preferably, all of the non-conjugated diene charge is fed only into the first reactor. (For example, where the resultant non-conjugated diene content in the polymer from the first reactor would be 6% and that from the second reactor 5%, the relative difference in diene content of the two polymers is at least 10%; in this example it is 20% greater.) Typically, after the desired polymerization has been completed the contents of the second or subsequent reactor is discharged, the polymerization reaction of the discharged contents is terminated, and the terpolymer is combined with FC, collected and finished. Any known solvent for the reaction mixture that is effective for the purpose can be used in conducting solution polymerizations in accordance with the present invention. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight 11 chain or branched chain hydrocarbons, particularly hexane. Nonlimiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In this embodiment the effluent from the reactor is in the form of a viscous (liquid like) solution of the polymer with the hydrocarbon monomers and solvents. Preferably a controlled volume of FC component(s) is mixed with the polymer effluent just before, or just after it exits from the reactor. The amount of fluorocarbon in the effluent is such that it induces a phase separation of the effluent solution into at least two distinct phases, a polymer rich phase and a polymer lean phase.

The polymer lean phase created by the phase separation contains a relatively high concentration of hydrocarbon materials (monomer, comonomer and solvents) that have been effectively extracted from the polymer by the action of the FC. The polymer rich phase created by the phase separation contains a relatively high concentration of polymer, typically 70% or more, with a substantially reduced concentration of dissolved hydrocarbons. The polymer material within the polymer rich phase may be in the form of liquid or solid depending on the temperature, type of FC employed and other factors. At relatively low temperatures the polymer is in solid form. In this case the separation process can be termed a "precipitation" process (i.e. the polymer is precipitated from solution).

In a preferred embodiment any of the polymerization processes described herein are a continuous process. For purposes of this invention and the claims thereto, by continuous is meant a system that operates (or is intended to operate) without interruption or cessation. For example a continuous process to produce a polymer would be one where the reactants are continually introduced into one or more reactors and polymer product is continually withdrawn.

In some embodiments it is preferred that the catalyst system used to produce the polymer not comprise titanium tetrachloride, particularly not the combination of $TiCl_4$ and aluminum alkyl (such as triethylaluminum), particularly when the FC is a perfluorocarbon. In situations where the catalyst is titanium tetrachloride, particularly the combination of $TiCl_4$ and aluminum alkyl (such as triethylaluminum) the FC is preferably a hydrofluorocarbon. In another embodiment, the catalyst is not a free radical initiator, such as a peroxide.

In another embodiment, the polymerization temperature is above room temperature (23° C.), preferably above 30° C., preferably above 50° C., preferably above 70° C.

Polymers produced according to this invention are olefin polymers or "polyolefins". By olefin polymers is meant that at least 75 mole % of the polymer is made of hydrocarbon monomers, preferably at least 80 mole %, preferably at least 85 mole %, preferably at least 90 mole %, preferably at least 95 mole %, preferably at least 99 mole %. In a particularly preferred embodiment, the polymers are 100 mole % hydrocarbon monomer. Hydrocarbon monomers are monomers made up of only carbon and hydrogen. In another embodiment of the invention up to 25 mol % of the polyolefin is derived from heteroatom containing monomers. Heteroatom containing monomers are hydrocarbon monomers where one or more hydrogen atoms have been replaced by a heteroatom. In a preferred embodiment, the heteroatom is selected from the group consisting of chlorine, bromine, oxygen, nitrogen, silicon and sulfur, preferably the heteroatom is selected from the group consisting of oxygen, nitrogen, silicon and sulfur, preferably the heteroatom is selected from the group consisting of oxygen and nitrogen, preferably oxygen. In a preferred embodiment, the heteroatom is not fluorine. In another embodiment of the invention, the monomers to be polymerized are not fluormonomers. Fluoromonomers are defined to be hydrocarbon monomers where at least one hydrogen atom has been replaced by a fluorine atom. In another embodiment of the invention, the monomers to be polymerized are not halomonomers. (By halomonomer is meant a hydrocarbon monomer where at least one hydrogen atom is replaced by a halogen.) In another embodiment of the invention, the monomers to be polymerized are not vinyl aromatic hydrocarbons. In another embodiment of the invention, the monomers to be polymerized are preferably aliphatic or alicyclic hydrocarbons (as defined under "Hydrocarbon" in Hawley's Condensed Chemical Dictionary, 13th edition, R. J. Lewis ed., John Wiley and Sons, New York, 1997). In another embodiment of the invention, the monomers to be polymerized are preferably linear or branched alpha-olefins, preferably C2 to C40 linear or branched alpha-olefins, preferably C2 to C20 linear or branched alpha-olefins, preferably ethylene, propylene, butene, pentene, hexene, heptene, octene, nonene, decene, undecene, dodecene, or mixtures thereof, more preferably ethylene, propylene, butene hexene and octene.

In another embodiment, the effluent containing the fluorocarbon is split into streams, such as hydrocarbon streams, and or waste stream and activated carbon is used to remove the fluorocarbon(s) from the streams, such as hydrocarbon streams and/or the waste streams. When using fluorocarbons in a process (such as a polymerization process or polymer recovery method) it is useful to prevent the escape of the fluorocarbons to the atmosphere. It is also useful to prevent the passage of fluorocarbons to the flare or other combustion process. Specifically, in some embodiments, activated carbon is used to remove the fluorocarbons from a gas or liquid process stream.

In another embodiment, the activated carbon would be used as the absorbent material in a Pressure Swing Adsorption (PSA) process. A PSA process employs at least two separate adsorption columns. One column operates as the active column, adsorbing material from the flow stream while the other operates off-line (at reduced pressure) in the "regeneration" mode. When the adsorption capacity of the active column is reached, the role of the columns is reversed. The alternating cycles of this process provide an effectively continuous flow path through the system, and a continuous removal of certain components from the flow stream (i.e. those components that are strongly adsorbed by the activated carbon, such as fluorocarbons). In another preferred embodiment, when using the activated carbon for removal of fluorocarbons from a process stream, a PSA system of a given size could operated at a reduced cycle frequency for improved reliability and reduced mechanical wear on the switching valve components as compared to a process stream of hydrocarbons without fluorocarbons. In another preferred embodiment, a PSA system could be designed with smaller sized columns for reduced cost when using the activated carbon for removal of fluorocarbons from a process stream as compared to a process stream of hydrocarbons without fluorocarbon.

In an alternative embodiment, the activated carbon is used as a safety "guard bed" downstream of a primary separation system. The purpose of this guard bed would be to capture any fluorocarbon material that may bypass the primary separation system. In this case, the advantages provided by the activated carbon would be similar to that described above with PSA. The size (and cost) of the guard bed could be reduced significantly.

EXAMPLES

An ethylene/octene copolymer and an ethylene/propylene copolymer were made according to the following procedure. The polymers were produced in a liquid filled, single-stage continuous reactor. The reactor was a 0.5-liter stainless steel autoclave reactor, equipped with a stirrer, an external water-cooling/steam-heating element with a temperature controller, and a pressure controller. Solvents, monomers, and comonomers, if present, were first purified by passing through a three-column purification system. The purification system consisted of an Oxiclear column (Model # RGP-R1-500 from Labclear) followed by a 5A and a 3 Å molecular sieve columns (purchased from Aldrich). The 5A and 3A purification columns were regenerated periodically whenever there was evidence of lower activity of polymerization. The regeneration was carried out under nitrogen at set temperatures of 260° C. and 315° C., respectively. The Oxiclear column was used as received.

The liquid feeds to the reactor (solvent and comonomers) were fed into a common manifold. Ethylene from an in-house supply was delivered to the manifold as a gas, and was solubilized with the chilled liquid mixture in the manifold. The mixture of solvent, monomer, and comonomer was further chilled to about −15° C. by passing through a chiller before being fed into the reactor through a single tube. All liquid flow rates to the manifold were measured using Brooks mass flow meters or Micro-Motion Coriolis-type flow meters. The ethylene flow was metered through a Brooks mass flow controller.

The catalyst compound used was rac-dimethylsilylbisindenyl hafnium dimethyl preactivated with N,N-dimethylanilinium tetrakis(pentafluorophenyl)borate (obtained from Albemarle) at a molar ratio of 1:1 to 1:1.1 in 700 ml of toluene mixed for at least 10 minutes prior to the polymerization reaction. During reaction, a metering pump was used to transfer the catalyst solution continuously to the reactor. The contact of catalyst, solvent/fluorocarbon and monomers took place in the reactor. The catalyst pump was calibrated periodically using toluene as the calibrating medium.

As an impurity scavenger, 250 ml of tri-n-octylaluminum (TNOA) (25 wt. % in toluene, Akzo Noble) was diluted in 22.83 kilogram of hexane. The diluted TNOA solution was stored in a 37.9-liter cylinder under nitrogen blanket. Feed rates of the tri-n-octylaluminum (TNOA) solution varied from polymerization reaction to reaction, ranging from 0 (no scavenger) to 4 ml per minutes in order to optimize the overall catalyst efficiency.

The reactor was first cleaned by continuously pumping solvent (e.g., hexane) and scavenger through the reactor system for at least one hour at a maximum allowed temperature (about 150° C.). After cleaning, the reactor was heated/cooled to the desired temperature using water/steam mixture flowing through the reactor jacket and controlled at a set pressure with controlled solvent flow. Monomers and catalyst solutions were then fed into the reactor to initiate polymerization. An automatic temperature control system was used to control and maintain the reactor at a set temperature. Onset of polymerization activity was determined by observations of a viscous product and a lower temperature of water/steam mixture in the reactor jacket (indicating exothermic heat of reaction). Once the reaction was established and system reached steady state, the reactor was lined out by maintaining the system under the established conditions for a time period of at least five times the mean residence in the reactor. The resulting mixture, containing mostly solvent, polymer and unreacted monomers, was collected in a collection box. The collected samples were first air-dried in a hood to evaporate most of the solvent, and then dried in a vacuum oven at a temperature of about 90° C. for about 12 hours. The vacuum dried samples were weighed to obtain polymer yields. The reaction conditions used and polymer properties are given in Table E1.

TABLE E1

Polymerization Conditions and Polymer Properties

| | Ethylene Propylene copolymer | Ethylene Octene copolymer |
|---|---|---|
| Reaction temperature (° C.) | 80 | 100 |
| Ethylene feed rate (SLPM) | 4 | 3 |
| Propylene (g/min) | 14 | 0 |
| Octene feed rate (ml/min) | 0 | 16 |
| Hexane feed rate (ml/min) | 90 | 80 |
| Catalyst feed rate (mol/min) | 5.05E−07 | 1.01E−06 |
| Yield (gram/min) | 10.8 | 10.0 |
| Conversion (%) | 58.5 | 67.4 |
| Ethylene (wt %) | 26.79 | 33.6 |
| Mn (g/mol) | 58,200 | 14,900 |
| Mw (g/mol) | 111,700 | 31,300 |
| Mz (g/mol) | 180,700 | 49,700 |
| Mw/Mn | 1.9 | 2.1 |

Example #1

Two grams of the ethylene/propylene copolymer were dissolved completely in 13.42 grams of hexane at room for over 24 hours. Then 12 ml of HFC365mfc (1,1,1,3,3-pentafluorobutane, obtained from Micro Care Corporation) was gradually added into the polymer solution. After addition of the HFC a phase separation of the solution was observed. A polymer rich phase was observed as a top layer, and polymer lean phase was observed in the bottom layer in the vial. The polymer rich phase was in the form of precipitated polymer. The precipitated polymer was recovered by filtration and about 1.9 grams of polymer were recovered.

Example #2

About 100 ml of the ethylene/octene copolymer effluent from the reactor was collected in a glass beaker. About 30 ml of HFC365mfc was added into the effluent gradually to induce complete phase separation/precipitation. Phase separated/precipitated polymer was recovery by filtration using #5 filter.

Test Methods

Molecular weight (Mw, Mn, and Mz) and molecular weight distribution (Mw/Mn) of the polymers were determined using gel permeation chromatography (GPC) on a Water 150 C high temperature chromatographic unit equipped with a DRI detector and four linear mixed bed columns (Polymer Laboratories PLgel Mixed-B LS, 20-micron particle size). The oven temperature was at 160° C. with the autosampler hot zone at 160° C. and the warm zone at 145° C. About 0.2 weight % of polymer sample was dissolved in 1,2,4-trichlorobenzene containing 200 ppm 2,6-di-t-butyl-4-methylphenol. The flow rate was 1.0 milliliter/minute and the injection size is 100 microliters.

Peak melting point (Tm) and peak crystallization temperature (Tc) were determined using the following procedure according to ASTM E 794-85. Differential scanning calorimetric (DSC) data was obtained using a TA Instruments model 2910 machine. Samples weighing approximately 7-10 mg were sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. Areas under the melting curves were measured and used to determine the heat of fusion and the degree of crystallinity according to ASTM 3417-99. The percent crystallinity was calculated using the formula, [area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) was used as the heat of fusion for 100% crystalline polypropylene.

The glass transition temperature (Tg) was measured by ASTM E 1356 using a TA Instruments model 2910 machine.

The ethylene content of ethylene/propylene copolymers produced using hydrocarbon solvent was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 $cm^{-1}$ to 4000 $cm^{-1}$ was recorded and the ethylene content in wt. % was calculated according to the following equation:

$$\text{ethylene content (wt. \%)} = 72.698 - 86.495X + 13.696X^2$$

where X=AR/(AR+1). The area under propylene band at ~1165 $cm^{-1}$ and the area of ethylene band at ~732 $cm^{-1}$ in the spectrum were calculated. The baseline integration range for the methylene rocking band is nominally from 695 $cm^{-1}$ to the minimum between 745 and 775 $cm^{-1}$. For the polypropylene band the baseline and integration range is nominally from 1195 to 1126 $cm^{-1}$. AR is the ratio of the area for the peak at ~1165 $cm^{-1}$ to the area of the peak at ~732 $cm^{-1}$.

Additional Examples

Examples

A series of absorption experimental runs were conducted in a simple, lab-scale column to determine the absorption capacity of two different types of activated carbon obtained from a vendor. The absorption capacities were measured with both types of activated carbon using three different types of hydrofluorocarbon (HFC-134a, HFC-236fa, and HFC-245fa). Results of these experiments are shown in Tables I and II.

The absorption column was a ½ inch (1.27 cm) OD stainless steel tubing with valves fitted on either side. The ½ inch (1.27 cm) stainless steel tubing was 9⅞ inches long (25.1 cm) with an internal diameter of 0.430 inch (10.9 mm). The column was packed with one of two types of activated carbon obtained from Calgon Carbon Corporation. The first sample was described by the vendor as "Calgon Activated Carbon, Type AP4-60." The second was described as "Calgon Activated Carbon, Type OVC Plus 4×6." The AP4-60 activated carbon was in the form of cylindrically shaped pellets, while the OVC Plus material was in the form of flakes. Both of these carbons were crushed with a mortar and pestle to a smaller size to fit inside the absorption column. The crushing reduced the average size of the particles or flakes to approximately 25 to 50 percent of their original size, with some fines. Glass wool packing was inserted on both ends of the column (next to the valves) to prevent any carbon from entering in to the valve areas. The HFC-245fa was obtained from Honeywell, as marketed under their trade name Enovate 3000. The HFC-236fa was obtained from DuPont, marketed as SUVA 236fa. The HFC-134a was an automotive grade material, marketed as R-134a. These materials were used as received without purification.

The fluorocarbon was allowed to vaporize or boil from its holding container through a line that led to the bottom of the absorption column. Between the column and the HFC source were two rotameters (flow indicating devices). Each rotameter had a flow range of 50 ml/min of air at 21.1° C. at atmospheric pressure. The rotameters were arranged in parallel to provide a flow range of 100 ml/min of air at atmospheric pressure. (The actual flow range of the rotameter depends on the Mw of known gas. For a gas of known Mw, the actual flow rate can be obtained from the indicated flow rate using methods that are well known in the art.) On the exit side of the absorption column, a ¼ inch (0.64 cm) line was directed down to a coil of stainless steel tubing that was contained within a beaker of dry ice. The chilled coil of stainless steel tubing acted as a condenser to liquefy (and detect) fluorocarbon gas coming from the absorption column. The downstream end of the condenser coil was vented to the atmosphere within a fume hood. Prior to each run, the weight of the empty column (with glass wool and valves) was weighed and recorded as the tare weight. The column was weighed again after the addition of activated carbon. The column was then connected to the feed and exit lines, and fluorocarbon (as a gas) was passed through the adsorption column. The flow rate of fluorocarbon was set at an indicated 25 to 30 ml/min on each rotameter. Initially there was no fluorocarbon condensed in the coil, indicating that the fluorocarbon was being adsorbed by the activated carbon in the column. Flow through the column was continued until some liquid began to "spit" out of the end of the condenser. This indicated that fluorocarbon was no longer being adsorbed by the column, and the limiting adsorption capacity had been reached. The flow of fluorocarbon gas was allowed to continue one more minute to ensure complete saturation, and the flow was then stopped. The valves on either side of the absorption column were closed and then the column removed and weighed. The increase in weight of the absorption column was taken as the weight of fluorocarbon adsorbed. Upon the completion of the run, the valves were removed and the activated carbon was poured out to prepare for the next test. No gas release was observed when opening or removing the valves, indicating that the fluorocarbon initially adsorbed during the tests remained adsorbed on the activated carbon.

TABLE I

Activated Carbon Absorption Results With Fluorocarbon (FC)

| Activated Carbon Type | FC Type | FC Mw (g/mole) | Wt. Empty Tube, w/valves (g) | Wt. of Tube w/Carbon (g) |
|---|---|---|---|---|
| AP4-60 | HFC-245fa | 134 | 394.30 | 406.42 |
| AP4-60 | R-134a | 102 | 394.45 | 406.74 |
| AP4-60 | HFC-236fa | 152 | 394.41 | 407.14 |
| OVC Plus | HFC-236fa | 152 | 394.46 | 405.10 |
| OVC Plus | R-134a | 102 | 394.44 | 405.68 |
| OVC Plus | HFC-245fa | 134 | 394.45 | 405.65 |

TABLE II

| Activated Carbon Type | Wt. Carbon (g) | Wt. of Tube w/Carbon & FC (g) | Wt. of FC Absorbed (g) | FC/C Ratio by Weight | FC/C Molar Ratio |
|---|---|---|---|---|---|
| AP4-60 | 12.12 | 412.75 | 6.33 | 0.522 | 0.0468 |
| AP4-60 | 12.29 | 410.93 | 4.19 | 0.341 | 0.0401 |
| AP4-60 | 12.73 | 413.81 | 6.67 | 0.524 | 0.0414 |
| OVC Plus | 10.64 | 411.39 | 6.29 | 0.591 | 0.0467 |
| OVC Plus | 11.24 | 410.92 | 5.24 | 0.466 | 0.0549 |
| OVC Plus | 11.20 | 412.39 | 6.74 | 0.602 | 0.0539 |

The above tests indicate that the activated carbon materials had surprisingly high adsorption capacities of between 34 to 60 percent of fluorocarbons by weight as indicated in Tables I and II. Thus in a preferred embodiment, the vent streams from a process could be purified (i.e. fluorocarbon removed) with reduced amounts of activated carbon than would normally be used in an activated carbon bed in a hydrocarbon process.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. A polymer recovery process comprising contacting a polymerization reactor effluent with a fluorinated hydrocarbon after the polymerization reaction has stopped and thereafter recovering olefin polymer, where the fluorinated hydrocarbon is present at 10 volume % to 80 volume % based upon the volume of the effluent and the fluorinated hydrocarbon, and where the polymerization is a continuous polymerization of at least 75 mole % of hydrocarbon monomers, based upon the total moles of monomer present in the reactor, and wherein the fluorinated hydrocarbon comprises a hydrofluorocarbon, provided that when the polymerization process is conducted in the presence of fluorinated hydrocarbon, additional fluorinated hydrocarbon (which may be the same or different from the first fluorinated hydrocarbon) is added to the polymerization reactor effluent after the polymerization reaction has stopped.

2. A polymer recovery process comprising devolatilizing a polymerization reactor effluent by contacting the effluent with a fluorinated hydrocarbon after the polymerization reaction has stopped, and thereafter removing volatiles from the effluent where the fluorinated hydrocarbon is present at 10 to 80 volume % based upon the volume of the effluent and the fluorinated hydrocarbon, and wherein the fluorinated hydrocarbon comprises a hydrofluorocarbon, provided that when the polymerization process is conducted in the presence of fluorinated hydrocarbon, additional fluorinated hydrocarbon (which may be the same or different from the first fluorinated hydrocarbon) is added to the polymerization reactor effluent after the polymerization reaction has stopped.

3. A polymer recovery process comprising reducing agglomeration in a polymerization reactor effluent by contacting the effluent with a fluorinated hydrocarbon after the polymerization reaction has stopped where the fluorinated hydrocarbon is present at 10 to 80 volume % based upon the volume of the effluent and the fluorinated hydrocarbon, and wherein the fluorinated hydrocarbon comprises a hydrofluorocarbon, provided that when the polymerization process is conducted in the presence of fluorinated hydrocarbon, additional fluorinated hydrocarbon (which may be the same or different from the first fluorinated hydrocarbon) is added to the polymerization reactor effluent after the polymerization reaction has stopped.

4. A polymer recovery process comprising reducing accumulation of polymer on surfaces of processing equipment from a polymerization reactor effluent by contacting the effluent with a fluorinated hydrocarbon after the polymerization reaction has stopped where the fluorinated hydrocarbon is present at 10 to 80 volume % based upon the volume of the effluent and the fluorinated hydrocarbon, and wherein the fluorinated hydrocarbon comprises a hydrofluorocarbon, provided that when the polymerization process is conducted in the presence of fluorinated hydrocarbon, additional fluorinated hydrocarbon (which may be the same or different from the first fluorinated hydrocarbon) is added to the polymerization reactor effluent after the polymerization reaction has stopped.

5. A polymer recovery process comprising precipitating polymer from a polymerization reactor effluent by contacting the effluent after the polymerization reaction has stopped with a fluorinated hydrocarbon in an amount effective to cause precipitation of at least 1 weight % of the polymer present and thereafter recovering precipitated polymer, where the fluorinated hydrocarbon is present at 10 volume % to 80 volume % based upon the volume of the effluent and the fluorinated hydrocarbon, and where the polymerization is a continuous polymerization of at least 75 mole % of hydrocarbon monomers, based upon the total moles of monomer present in the reactor, and wherein the fluorinated hydrocarbon comprises a hydrofluorocarbon, provided that when the polymerization process is conducted in the presence of fluorinated hydrocarbon, additional fluorinated hydrocarbon (which may be the same or different from the first fluorinated hydrocarbon) is added to the polymerization reactor effluent after the polymerization reaction has stopped.

6. A polymer recovery process comprising separating polymer from a polymerization reactor effluent comprising contacting the effluent with a fluorinated hydrocarbon after the polymerization reaction has stopped, forming a polymer rich phase and a polymer lean phase, and thereafter recovering polymer from the polymer rich phase, where the fluorinated hydrocarbon is present at 10 volume % to 80 volume % based upon the volume of the effluent and the fluorinated hydrocarbon, and where the polymerization is a continuous polymerization of at least 75 mole % of hydrocarbon monomers, based upon the total moles of monomer present in the reactor, and wherein the fluorinated hydrocarbon comprises a hydrofluorocarbon, provided that when the polymerization process is conducted in the presence of fluorinated hydrocarbon, additional fluorinated hydrocarbon (which may be the same or different from the first fluorinated hydrocarbon) is added to the polymerization reactor effluent after the polymerization reaction has stopped.

7. The process of claim 1 wherein the fluorinated hydrocarbon is represented by the formula: $C_xH_yF_z$ wherein x is an integer from 1 to 40, y is an integer greater than or equal to 0 and z is an integer and is at least one.

8. The process of claim 7 wherein the fluorinated hydrocarbon comprises a perfluorinated hydrocarbon.

9. The process of claim 1 where the fluorinated hydrocarbon is not a perfluorinated C4 to C10 alkane.

10. The process of claim 1 wherein the fluorinated hydrocarbon comprises one or more of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3, 3-heptafluorobutane; 1,1,1,2,2,4,4-heptafluorobutane; 1,1,1, 2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3, 4-hexafluorocyclobutane; 1,1,2,3,3,4-hexafluorocyclobutane; and 1,1,2,2,3,3,4-heptafluorocyclobutane.

11. The process claim 1 wherein the fluorinated hydrocarbon comprises one or more of difluoromethane, trifluoromethane, 1,1-difluoroethane, 1,1,1-trifluoroethane, fluoromethane, and 1,1,1,2-tetrafluoroethane.

12. The process claim 1 wherein the fluorinated hydrocarbon comprises one or more of 1,1,1,3,3,3-hexafluoropropane, 1,1,1,2-tetrafluoroethane, 1,1,1,3,3-pentafluoropropane, 1,1, 1,3,3-pentafluorobutane, octafluorocyclobutane, and 2,3-dihydrodecafluoropentane.

13. The process of claim 1 where fluorinated hydrocarbon is added to the polymerization reactor effluent after exiting the reactor.

14. The process claim 1 where fluorinated hydrocarbon is added to the polymerization reactor effluent before exiting the reactor.

15. The process of claim 1 where the fluorinated hydrocarbon is present at 20 to 50 volume % based upon the volume of the effluent and the fluorinated hydrocarbon.

16. The process of claim 15 where the fluorinated hydrocarbon is present at 25 to 50 volume % based upon the volume of the effluent and the fluorinated hydrocarbon.

17. The process of claim 16 where the fluorinated hydrocarbon is present at 30 to 40 volume % based upon the volume of the effluent and the fluorinated hydrocarbon.

18. The process of claim 1 where the fluorinated hydrocarbon is introduced into a flash tank.

19. The process of claim 18 where the fluorinated hydrocarbon is combined with the polymerization reactor effluent and thereafter the combination is introduced into a flash tank.

20. The process of claim 1 where the fluorinated hydrocarbon is introduced into a purge vessel.

21. The process of claim 20 where the fluorinated hydrocarbon is combined with the polymerization reactor effluent and thereafter the combination is introduced into a purge vessel.

22. The process of claim 1 where the fluorinated hydrocarbon is introduced into a settling tank.

23. The process of claim 22 where the fluorinated hydrocarbon is combined with the polymerization reactor effluent and thereafter the combination is introduced into a settling tank.

24. The process of claim 1 where the effluent is split into streams, including a waste stream, and the waste stream is passed through activated carbon to remove at least a portion of the fluorocarbon.

25. The process of claim 24 where the effluent is split into streams, including a waste stream, and the waste stream is passed through activated carbon prior to being sent to a flare.

26. The process of claim 1 where the hydrocarbon monomers are not vinyl aromatic hydrocarbons.

27. The process of claim 1 where the hydrocarbon monomers are aliphatic or alicyclic hydrocarbons.

28. The process of claim 1 where the hydrocarbon monomers are linear or branched alpha-olefins.

29. The process of claim 1 where the hydrocarbon monomers are ethylene, propylene, butene, pentene, hexene, heptene, octene, nonene, decene, undecene, dodecene, or mixtures thereof.

30. The process of claim 1 where the continuous polymerization process is conducted in the presence of fluorocarbon and additional fluorocarbon is added to the effluent.

31. The process of claim 2 wherein the fluorinated hydrocarbon comprises one or more of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3, 3-heptafluorobutane; 1,1,1,2,2,4,4-heptafluorobutane; 1,1,1, 2,2,3,4-heptafluorobutane; 1,1,1,2,3,3,4-heptafluorobutane; 1,1,1,2,3,4,4-heptafluorobutane; 1,1,1,2,4,4,4-heptafluororobutane; 1,1,1,3,3,4,4-heptafluorobutane; 1,1,1,2,2,3,3,4-octafluorobutane; 1,1,1,2,2,3,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; and 1,1,2,2,3,3,4-heptafluorocyclobutane.

32. The process of claim 2 where fluorinated hydrocarbon is added to the polymerization reactor effluent after exiting the reactor.

33. The process claim 2 where fluorinated hydrocarbon is added to the polymerization reactor effluent before exiting the reactor.

34. The process of claim 2 where the fluorinated hydrocarbon is introduced into a flash tank, settling tank or purge vessel.

35. The process of claim 2 where the fluorinated hydrocarbon is combined with the polymerization reactor effluent and thereafter the combination is introduced into a flash tank, settling tank or purge vessel.

36. The process of claim 2 where the effluent is split into streams, including a waste stream, and the waste stream is passed through activated carbon to remove at least a portion of the fluorocarbon.

37. The process of claim 36 where the effluent is split into streams, including a waste stream, and the waste stream is passed through activated carbon prior to being sent to a flare.

38. The process of claim 2 where the hydrocarbon monomers are ethylene, propylene, butene, pentene, hexene, heptene, octene, nonene, decene, undecene, dodecene, or mixtures thereof.

39. The process of claim 3 wherein the fluorinated hydrocarbon comprises one or more of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,2,2,3,3-hexafluorobutane; 1,2,2,3,4-hexafluorobutane; 1,2,2,4,4-hexafluorobutane; 1,2,3,3,4-hexafluorobutane; 1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; and 1,1,2,2,3,3,4-heptafluorocyclobutane.

40. The process of claim 3 where fluorinated hydrocarbon is added to the polymerization reactor effluent after exiting the reactor.

41. The process claim 3 where fluorinated hydrocarbon is added to the polymerization reactor effluent before exiting the reactor.

42. The process of claim 3 where the fluorinated hydrocarbon is introduced into a flash tank, settling tank or purge vessel.

43. The process of claim 3 where the fluorinated hydrocarbon is combined with the polymerization reactor effluent and thereafter the combination is introduced into a flash tank, settling tank or purge vessel.

44. The process of claim 3 where the effluent is split into streams, including a waste stream, and the waste stream is passed through activated carbon to remove at least a portion of the fluorocarbon.

45. The process of claim 44 where the effluent is split into streams, including a waste stream, and the waste stream is passed through activated carbon prior to being sent to a flare.

46. The process of claim 3 where the hydrocarbon monomers are ethylene, propylene, butene, pentene, hexene, heptene, octene, nonene, decene, undecene, dodecene, or mixtures thereof.

47. The process of claim 6 wherein the fluorinated hydrocarbon comprises one or more of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane; 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; and 1,1,2,2,3,3,4-heptafluorocyclobutane.

48. The process of claim 6 where fluorinated hydrocarbon is added to the polymerization reactor effluent after exiting the reactor.

49. The process claim 6 where fluorinated hydrocarbon is added to the polymerization reactor effluent before exiting the reactor.

50. The process of claim 6 where the fluorinated hydrocarbon is introduced into a flash tank, settling tank or purge vessel.

51. The process of claim 6 where the fluorinated hydrocarbon is combined with the polymerization reactor effluent and thereafter the combination is introduced into a flash tank, settling tank or purge vessel.

52. The process of claim 6 where the effluent is split into streams, including a waste stream, and the waste stream is passed through activated carbon to remove at least a portion of the fluorocarbon.

53. The process of claim 52 where the effluent is split into streams, including a waste stream, and the waste stream is passed through activated carbon prior to being sent to a flare.

54. The process of claim 6 where the hydrocarbon monomers are ethylene, propylene, butene, pentene, hexene, heptene, octene, nonene, decene, undecene, dodecene, or mixtures thereof.

55. The process of claim 4 wherein the fluorinated hydrocarbon comprises one or more of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4- pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl) propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl) propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; and 1,1,2,2,3,3,4-heptafluorocyclobutane.

56. The process of claim 4 where fluorinated hydrocarbon is added to the polymerization reactor effluent after exiting the reactor.

57. The process claim 4 where fluorinated hydrocarbon is added to the polymerization reactor effluent before exiting the reactor.

* * * * *